United States Patent Office 3,326,693
Patented June 20, 1967

3,326,693
METHOD FOR MANUFACTURING SOUR MILK AND SOUR MILK PRODUCTS
Gerhard Reuter, Berlin, Germany, assignor to Evog Etablissement für Verwaltung und Organization, Vaduz, Liechtenstein
No Drawing. Filed Aug. 11, 1964, Ser. No. 388,922
Claims priority, application Germany, Aug. 13, 1963, E 25,339
6 Claims. (Cl. 99—59)

ABSTRACT OF THE DISCLOSURE

A method of manufacturing a fermented milk product in which an intestinal strain of *Lactobacillus acidophilus* is incubated in a nutrient medium which consists essentially of sterile milk having one percent by weight of casein peptone mixed therein in order to form a preliminary culture, and then a further quantity of milk is inoculated with the preliminary culture and with lactic acid producing bacteria to produce the fermented milk product.

---

The invention relates to a method for manufacturing sour or fermented milk or milk products in which a parent culture, occurring in human intestines as a variant of *Lactobacillus acidophilus*, is propagated in milk to form a preliminary culture, the propagation being carried out so as to preserve the characteristic properties of the variant, and then said preliminary culture is added to milk or milk products together with ordinary lactic acid producing bacteria, to ferment the milk.

It has been attempted for a long time to manufacture sour milk by adding a *Lactobacillus acidophilus* culture to milk. Basically, the present invention is based on the concept of introducing to humans by means of a sour milk product a particular strain of *Lactobacillus acidophilus* capable of rejuvenating the intestinal flora, instead of the Lactobacillus strains used up to now for the manufacture of yoghurt which were merely passive or even inhibited growth of the flora. The use of a *Lactobacillus acidophilus* culture for the manufacture of sour milk can lead to advantageous results if care is taken to choose the correct strain of the *Lactobacillus acidophilus* from the four variants thereof which have been recently defined (Rogosa and coworkers, 1953; Davis, 1955; Wheater, 1955; Lerche and Reuter, 1962) and if it is introduced as an additive into the milk so that an ample amount of it is contained in the finished product and so that it retains its characteristic features therein. These characteristic features in addition to the characteristic features for the bacteriological genus "Lactobacillus" as set forth in "Bergey's Manual of Determinative Bacteriology" (1957), are, for the intestinal strain of *Lactobacillus acidophilus*, the capacity of forming acids by fermentation of glucose, fructose, galactose, mannose, maltose, sucrose, lactose, trehalose, cellobiose, sorbitol, salicin and aesculin, but not forming acids from arabinose, xylose, rhamnose, melibiose, raffinose, inulin, mannitol, dulcitol and inositol. The proper strain of *Lactobacillus acidophilus* has the further characteristics that it forms no gas from glucose and no growth occurs at 20 degrees C. The term "intestinal strain of *Lactobacillus acidophilus*" used in the following description and claims, shall mean a bacteria having the properties referred to above.

If a preliminary propagation of the intestinal strain of *Lactobacillus acidophilus* is not carried out then there will be no Lactobacilli with the above described qualities present in the resulting sour milk product and the purpose of introducing the intestinal strain of *Lactobacillus acidophilus* into the sour milk will not be accomplished.

In spite of the selection of the intestinal strain of the *Lactobacillus acidophilus* for the sour milk preparation, it has happened that the sour milk manufactured using this bacteria contains the *Lactobacillus acidophilus* only in a small amount or not at all. *Lactobacillus acidophilus* is not able to produce quickly the fermented milk product, because the fermentation phase lasts for a long time. Moreover, if the milk inoculated with the *Lactobacillus acidophilus* culture contains other bacteria, which can occur even in pasteurized milk, there exists the danger that these bacteria may suppress or stop the growth of the *Lactobacillus acidophilus*. In such case the desired development of the *Lactobacillus acidophilus* does not occur so that it either is not present at all or is present only in a small quantity in the sour milk. This problem occurs also if the *Lactobacillus acidophilus* is propagated in a known manner together with common lactic acid forming bacteria in the manufacture of the sour milk products. In such case it can also happen that the rapidly growing lactic acid bacteria substantially destroy the *Lactobacillus acidophilus* so that the latter is not detectable in the finished product.

Further, it is also already known to add *Lactobacillus acidophilus* bacteria in a freeze-dried condition and ordinary lactic acid forming bacteria in order to ferment milk. This method also does not always lead to desirable results because the freeze-dried bacteria exist in an inactive form and do not attain the desired capacity for sufficient growth in the milk.

The purpose of the invention is to improve upon the procedures of the type above defined so that the *Lactobacillus acidophilus* culture remains viable in the milk used for the sour milk manufacture and is not likely to be overcome by other bacteria. According to the invention this is accomplished by forming a preliminary culture of the *Lactobacillus acidophilus* in sterile milk in which at least about 1 percent, based on the weight of the milk, of casein peptone is added to the sterile milk before the inoculation of the milk with the parent culture of *Lactobacillus acidophilus*.

It has been shown that through the addition of casein peptone at the time of the preliminary propagation, an increase of *Lactobacillus acidophilus* bacteria occurs in the milk and these bacteria are very vigorous and full of life. In this manner it has been made possible to introduce effective amounts of the intestinal strain of *Lactobacillus acidophilus* into people by means of food which has been manufactured according to the method of the invention.

The preliminary propagation is carried out by adding the parent culture of *Lactobacillus acidophilus* to the milk having the casein peptone mixed therein, the parent culture being added in an amount of about 4–5 percent, based on the weight of the milk, and the culture so prepared is incubated at 37–40 degrees C. for 12–20 hours.

Since the milk used for the preparation of the preliminary culture is sterilized, the carbohydrate content thereof is lessened. To correct this, it is particularly desirable that glucose be added to the sterile milk before the introduction of the parent culture, the amount of glucose added being about 1 percent based on the weight of the milk. The glucose acts especially effectively for increasing the quantity of the *Lactobacillus acidophilus* grown in the sterile milk.

The sterilization of the milk used for the preliminary propagation can be carried out in a known manner by twice heating pasteurized milk for an interval of several hours or for several days at 90–100 degrees C. For properly carrying out the method it is nevertheless desirable that the pasteurized milk used for the preliminary propagation be heated in a known manner once more at 90–100 degrees C., and that potassium sorbate be added in an amount of 0.1 percent based on the weight of the milk. The addition of the potassium sorbate to the milk, which has been heated once more after it has been pasteurized, inhibits growth of aerobe spore building organisms so that the *Lactobacillus acidophilus* can grow unhindered to its full development.

According to an essential further aspect of the invention, the *Lactobacillus acidophilus* culture is not used alone but, rather, is used together with a preliminary culture of common lactic acid forming bacteria in order to ferment the milk used for the manufacture of the end product in a defined proportion. In this manner, according to the invention, for the manufacture of the sour milk end product, milk in a known manner is prepared and cooled after heating in a known manner to about 50° C. Then, there is added to the milk 4 percent of the *Lactobacillus acidophilus* culture, based on the weight of the milk, and 1–2 percent of a common lactic acid forming culture, based on the weight of the milk. Thereafter the milk is incubated at about 37 degrees C. (maximum 40 degrees C.), for an incubation period of 2½–3 hours. To obtain good quality, it may be desirable to modify the procedure by adding to the milk intended for the manufacture of sour milk end product, 4 percent based on the weight of the milk of the *Lactobacillus acidophilus* culture following which the milk is incubated for at least one hour at a maximum temperature of 40 degrees C. Then an ordinary lactic acid forminng culture is added in an amount of 1–2 percent, based on the weight of the milk, and then the milk is further incubated at a maximum temperature of 40 degrees C. If this or the first procedure is followed, the quickly acidifying bacteria restrain growth of any undesired bacteria which are still contained in the original milk after its pasteurization, so that the latter cannot suppress growth of the *Lactobacillus acidophilus*. The *Lactobacillus acidophilus* thus develops to a sufficient degree and will be present in ample amounts in food made from this milk and will become present in greater quantity in human intestines.

EXAMPLE

According to the method of the invention, sour milk can, for example, be manufactured in the following manner:

First there is manufactured a parent culture of *Lactobacillus acidophilus*. For this purpose the intestinal strain of *Lactobacillus acidophilus* (the strain not fermenting in raffinose and melibiose) is selected. It can be grown readily by culturing on plates under anaerobic conditions and it should be tested appropriately to make sure it is a pure culture. These conditions will be accomplished by filling an evacuative desiccator or a Zeissler chamber with hydrogen and carbon dioxide. As the nutrient medium for forming the parent culture, a medium comprised of tomato juice, autolyzed yeast, and agar is of substantial value. The following nutrient medium is especially effective:

400 ml. cooked and filtered Libby's tomato juice diluted with distilled water (1 part tomato juice to 3 parts water).
100 ml. prepared autolyzed yeast diluted with distilled water (1 part yeast to 5 parts water) (corresponding approximately to 6 grams commercial yeast extract).
1 ml. Tween 80 (not absolutely necessary).
8 grams peptone made from casein (Merck).
8 grams peptone made from meat (Merck).
20 g. glucose.
5 g. NaCl.
0.5 g. soluble starch.
20 grams Agar-Agar.
1000 ml. distilled water.
pH=6.8.
Sterilization at 110° C. for 30 minutes.

The parent culture can then be propagated in sterile milk, to which 1 percent casein peptone has been added.

In order to develop a preliminary culture out of the parent culture the milk used for making the preliminary culture is first so prepared that the added *Lactobacillus acidophilus* bacteria cannot be overcome by other bacteria. This can be brought about either by twice heating the milk at 90–100 degrees C. for a period of several hours or one day in order to make it nearly entire bacteria free or by adding 0.1 percent potassium sorbate based on the weight of the milk to milk heated previously to 90–100 degrees. In both cases 1 percent casein peptone and 1 percent glucose, both based on the weight of the milk, are added to the milk. The casein peptone and glucose must be also sterile.

The milk so prepared is inoculated with the parent culture, the amount of the parent culture being about 4–5 percent, based on the weight of the milk. Next there follows an incubation at 37 degrees C. (maximum 40 degrees C.) for 12–20 hours. The preliminary culture is then fully developed. The starting milk which is to be used for sour milk preparation is inoculated with the preliminary culture at a temperature of about 50 degrees C. About 4 percent of the preliminary culture, based on the weight of the milk, is used. At the same time a common lactic acid producing culture is added in an amount of about 1–2 percent based on the weight of the milk. The milk is then incubated at 37 (maximum 40) degrees C. for 2½ to 3 hours.

Instead of mixing the preliminary culture and the lactic acid producing bacteria culture with the milk simultaneously, the preliminary culture can be added first in an amount of about 4 percent and then the milk can be incubated for an hour at a maximum of 40 degrees C. Subsequently an ordinary lactic acid producing culture is then added in an amount again of 1–2 percent based on the weight of milk whereupon the milk is further incubated at a maximum of 40 degrees C. The final pH value of the finished product should lie around 4.3. According to the possibility for cooling the product must be put out of the procedure at a pH value of 4.6–4.8.

For testing the finished product to determine its content of *Lactobacillus acidophilus* a medium corresponding essentially to the above-described nutrient medium is appropriate for the development of the parent culture. To this nutrient medium there is added 0.04% sorbic acid while at the same time the pH value is lowered to 5.0. It is not heated at 110° C. but at 100° C. for 30 minutes. In this manner there is provided a selective medium in which (1) the *Lactobacillus acidophilus* can come to its full development even though in somewhat smaller amounts, and (2) the growth of the gram negative bacteria, the gram positive catalase positive bacilli, are inhibited, as is also the growth of yeast and the mold fungi. Only a few coccus species have the power under these circumstances to grow of course in very small colonies. The growth of the milk streptococci, such as *Streptococcus thermophilus* and *Streptococcus lactis* as well as *Lactobacillus bulgaricus* is inhibited, but not the common Lactobacilli. In such a selective medium the colony morphology and bacteria morphology is easily identified so that it can be determined whether the *Lactobacillus acidophilus* of the intestine strain exists therein.

Although a particular preferred embodiment of the invention has been disclosed in detail above for illustrative purposes, it will be understood that variations or modifications of such disclosure, which lie within the scope of the appended claims are fully contemplated.

What is claimed is:

1. A method of manufacturing a fermented milk product, which comprises preparing a nutrient medium consisting essentially of sterile milk having one percent by weight, based on the weight of the milk, of peptone obtained from casein mixed therein;

inoculating said nutrient medium with an intestinal strain of *Lactobacillus acidophilus* and incubating said medium to form a preliminary culture of *Lactobacillus acidophilus*, said intestinal strain of *Lactobacillus acidophilus* being characterized by its inability to ferment melibiose and raffinose, and by the further characteristics that it forms no gas from glucose and no growth of it occurs at 20° C.; and then inoculating a further quantity of milk with said preliminary culture and with lactic acid producing bacteria to produce a cultured milk product.

2. A method according to claim 1, in which sterile glucose is added to the nutrient medium in an amount of about 1 percent based on the weight of the milk before the nutrient medium is inoculated with the intestinal strain of *Lactobacillus acidophilus*.

3. A method according to claim 1 in which the amount of the intestinal strain of *Lactobacillus acidophilus* added to the nutrient medium is from about 4 percent to about 5 percent by weight, based on the weight of the milk, and the incubation is carried out at 37–40 degrees C. for 12–20 hours.

4. A method according to claim 1, in which the sterile milk used to make the nutrient medium is preliminarily heated at 90–100 degrees C. and potassium sorbate is added to an amount of about 0.1 percent by weight, based on the weight of the milk.

5. A method according to claim 1, in which the milk selected for the manufacture of the fermented milk product is prepared in the usual manner and is cooled to a temperature about 50 degrees C., then about 4 percent by weight, based on the weight of the milk, of the *Lactobacillus acidophilus* preliminary culture and from about 1 to 2 percent by weight, based on the weight of the milk, of usual lactic acid producing bacteria are added to the milk and then the milk is incubated at a temperature of 37–40° C. for a period of 2½ to 3 hours.

6. A method according to claim 1, in which the milk selected for the manufacture of the fermented milk product is cultured by adding thereto about 4 percent by weight, based on the weight of the milk, of the *Lactobacillus acidophilus* preliminary culture, whereupon the mixture is held for at least one hour at 37–40 degrees C. and then subsequently usual lactic acid producing bacteria is added in an amount of from about 1 to 2 percent by weight, based on the weight of the milk, and the milk then further held at 37–40 degrees C. to complete the culturing.

References Cited
UNITED STATES PATENTS 2,936,237   3/1960   Schmidt-Burbach _____ 99—59

A. LOUIS MONACELL, *Primary Examiner.*

L. M. SHAPIRO, *Assistant Examiner*